United States Patent
Son et al.

(10) Patent No.: US 10,372,742 B2
(45) Date of Patent: Aug. 6, 2019

(54) APPARATUS AND METHOD FOR TAGGING TOPIC TO CONTENT

(71) Applicant: ELECTRONICS AND TELECOMMUNICATIONS RESEARCH INSTITUTE, Daejeon (KR)

(72) Inventors: Jeong Woo Son, Daejeon (KR); Sun Joong Kim, Sejong (KR); Won Joo Park, Daejeon (KR); Sang Yun Lee, Daejeon (KR); Won Ryu, Seoul (KR); Sang Kwon Kim, Daejeon (KR); Seung Hee Kim, Daejeon (KR); Woo Sug Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 406 days.

(21) Appl. No.: 15/253,233

(22) Filed: Aug. 31, 2016

(65) Prior Publication Data

US 2017/0060999 A1    Mar. 2, 2017

(30) Foreign Application Priority Data

Sep. 1, 2015   (KR) .................. 10-2015-0123717
Jan. 27, 2016  (KR) .................. 10-2016-0009774

(51) Int. Cl.
*G06F 16/00*   (2019.01)
*G06F 16/35*   (2019.01)
(Continued)

(52) U.S. Cl.
CPC ........ *G06F 16/353* (2019.01); *G06F 16/7844* (2019.01); *G06F 16/7867* (2019.01);
(Continued)

(58) Field of Classification Search
None
See application file for complete search history.

(56) References Cited

U.S. PATENT DOCUMENTS

| | | |
|---|---|---|
| 2010/0241626 A1 | 9/2010 | Lee et al. |
| 2012/0102120 A1 | 4/2012 | Canoy et al. |
| (Continued) | | |

FOREIGN PATENT DOCUMENTS

| | | |
|---|---|---|
| JP | 2010-288024 A | 12/2010 |
| JP | 2012-155695 A | 8/2012 |
| (Continued) | | |

OTHER PUBLICATIONS

KRnet. "Smart broadcasting technology for building open-media ecosystem", The 23rd Korea Internet Conference, Jun. 22-23, 2015.

*Primary Examiner* — Bai D Vu
(74) *Attorney, Agent, or Firm* — Rabin & Berdo, P.C.

(57) ABSTRACT

Disclosed is an apparatus and method for tagging a topic to content. The apparatus may include an unstructured data-based topic generator configured to generate a topic model including an unstructured data-based topic based on content and unstructured data, a viewer group analyzer configured to analyze a characteristic of a viewer group including a viewer of the content based on a social network of the viewer and viewing situation information of the viewer, a multifaceted topic generator configured to generate a multifaceted topic based on the topic model and the characteristic of the viewer group, a content divider configured to divide the content into a plurality of scenes, and a tagger configured to tag the multifaceted topic to the scenes.

15 Claims, 6 Drawing Sheets

(51) Int. Cl.
  *G11B 27/00*   (2006.01)
  *H04N 21/258*  (2011.01)
  *H04N 21/4788* (2011.01)
  *H04N 21/8405* (2011.01)
  *H04N 21/845*  (2011.01)
  *G06F 16/78*   (2019.01)
  *G06F 16/783*  (2019.01)

(52) U.S. Cl.
  CPC ....... *G11B 27/00* (2013.01); *H04N 21/25891* (2013.01); *H04N 21/4788* (2013.01); *H04N 21/8405* (2013.01); *H04N 21/8456* (2013.01)

(56) References Cited

U.S. PATENT DOCUMENTS

| | | |
|---|---|---|
| 2012/0124089 A1   | 5/2012  | Sim et al. |
| 2012/0236201 A1*  | 9/2012  | Larsen .................. G06Q 10/10 348/468 |
| 2012/0239690 A1*  | 9/2012  | Asikainen ......... G06F 17/30038 707/770 |
| 2013/0054638 A1   | 2/2013  | Kim |
| 2015/0187390 A1   | 7/2015  | Pacurariu et al. |

FOREIGN PATENT DOCUMENTS

| | | |
|---|---|---|
| JP | 2014-006844 A    | 1/2014 |
| KR | 10-0828166 B1    | 5/2008 |
| KR | 10-2010-0069139 A | 6/2010 |
| KR | 10-1002070 B1    | 12/2010 |
| KR | 10-2014-0055835 A | 5/2014 |

\* cited by examiner

APPARATUS AND METHOD FOR TAGGING TOPIC TO CONTENT

CROSS-REFERENCE TO RELATED APPLICATION(S)

This application claims the priority benefit of Korean Patent Application No. 10-2015-0123717 filed on Sep. 1, 2015, and Korean Patent Application No. 10-2016-0009774 filed on Jan. 27, 2016, in the Korean Intellectual Property Office, the disclosures of which are incorporated herein by reference for all purposes.

BACKGROUND

1. Field

One or more example embodiments relate to broadcasting communication technology, and more particularly, to an apparatus and method for tagging, to broadcast content that is divided by a certain unit, a combination of a topic obtained by analyzing related data and viewer information about a viewer of the broadcast content.

2. Description of Related Art

A service of recommending and searching contents personalized for a viewer, or a content-related advertisement service are provided. As one of technologies for such services, automatic tagging technology for broadcast content may be used.

Existing related technology may involve information associated with broadcast content, for example, a broadcast date, a producer, and a compressed form of the content, and other additional information including, for example, an actor or actress who appears in the content and a location appearing in the content. The technology may adopt a manual maneuver that requires a human act to process most of such information.

Although the automatic tagging technology is used for some of such information, a scope of the information to be tagged may be limited to a character who appears in content or an object in the content because a target from which the information is to be extracted is restricted to a domain that occurs in the content, for example, subtitles and lines (or dialogues).

Thus, the existing technology may convey only limited or local information associated with content to a viewer, failing to provide the viewer with more various pieces of information associated the content, and a provider of the content may not be able to diversify a profit model.

SUMMARY

An aspect provides an apparatus and method for tagging a multifaceted topic to content based on viewing situation information and unstructured data to provide a user with various information associated with the content.

According to an aspect, there is provided an apparatus for tagging a topic to content based on a viewing situation, the apparatus including an unstructured data-based topic generator configured to generate a topic model including an unstructured data-based topic based on the content and unstructured data, a viewer group analyzer configured to analyze a characteristic of a viewer group including a viewer of the content based on a social network of the viewer and viewing situation information of the viewer, a multifaceted topic generator configured to generate a multifaceted topic based on the topic model and the characteristic of the viewer group, a content divider configured to divide the content into a plurality of scenes, and a tagger configured to tag the multifaceted topic to a scene obtained through the division.

The unstructured data-based topic generator may include a content-related unstructured data collector configured to collect, from the content, content-related unstructured data associated with the content, a keyword extractor configured to extract a first keyword and a second keyword from the content-related unstructured data, and a topic model generator configured to generate the unstructured data-based topic on the content using the first keyword and the second keyword and generate the topic model based on the unstructured data-based topic. The second keyword may be determined among first keywords based on respective frequency numbers of the first keywords.

The unstructured data-based topic generator may include an external unstructured data analyzer configured to extract a third keyword from external unstructured data, and a model expander configured to expand the topic model based on the third keyword.

The viewer group analyzer may include a social network generator configured to generate the social network based on online information of the viewer, a proximity network generator configured to generate a proximity network from the viewing situation information, a network integrator configured to integrate the social network and the proximity network, and a group characteristic extractor configured to extract a common characteristic of the viewer group based on an integrated network obtained through the integration.

The apparatus may further include a viewer group extractor configured to extract the viewer group from the integrated network.

The multifaceted topic generator may include a correlation analyzer configured to analyze a correlation between the unstructured data-based topic and the characteristic of the viewer group, and a weight calculator configured to calculate a weight for each viewer group corresponding to the unstructured data-based topic based on the correlation and apply the calculated weight to the topic model.

The multifaceted topic generator may further include a topic model retrainer configured to change the topic model based on the correlation.

The tagger may analyze a correlation between the viewer group and the scene and a correlation between the multifaceted topic and the scene, and tag the multifaceted topic to the scene based on the correlation between the viewer group and the scene and the correlation between the multifaceted topic and the scene.

The correlation between the multifaceted topic and the scene may be analyzed based on a correlation between the first keyword and the scene. The first keyword may be extracted from the content-related unstructured data associated with the content.

According to another aspect, there is provided a method of tagging a topic, the method including generating a topic of broadcast content, extracting a characteristic of a viewer group based on viewing information of a viewer of the broadcast content, generating a multifaceted topic based on the topic of the broadcast content and the characteristic of the viewer group, and tagging the multifaceted topic to divided broadcast content.

According to still another aspect, there is provided a method of tagging a topic to content based on a viewing situation, the method including generating a topic model including an unstructured data-based topic based on the content and unstructured data, analyzing a characteristic of a viewer group including a viewer of the content based on a social network of the viewer and viewing situation information of the viewer, generating a multifaceted topic based on the topic model and the characteristic of the viewer group, dividing the content into a plurality of scenes, and tagging the multifaceted topic to a scene obtained through the division.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
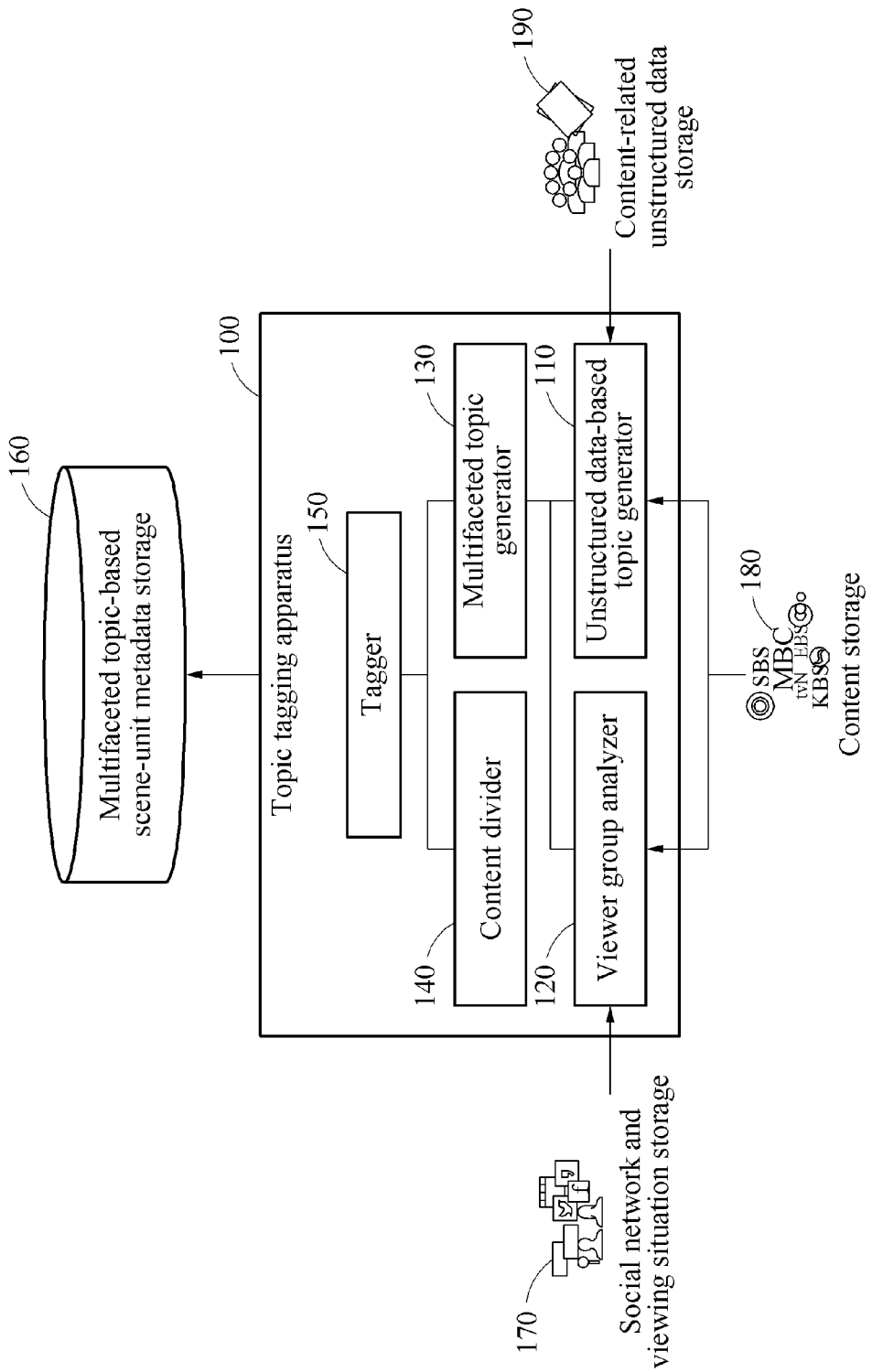
FIG. 1 is a diagram illustrating a configuration of an apparatus for tagging a topic according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure. Reference throughout this disclosure to "example embodiment(s)" (or the like) means that a particular feature, constituent or agent, step or characteristic described in connection with the embodiment is included in at least one embodiment. Thus, appearances of the phrases "according to example embodiments" or "an embodiment" (or the like) in various places throughout the disclosure are not necessarily all referring to the same example embodiment.

Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Example embodiments to be described hereinafter may be applicable to identify a movement of an object included in a moving picture, or a video, and determine a type of the identified movement.

Hereinafter, example embodiments are described in detail with reference to the accompanying drawings. Like reference numerals in the drawings denote like elements, and a known function or configuration will be omitted herein.

FIG. 1 is a diagram illustrating a configuration of an apparatus for tagging a topic according to an example embodiment. Hereinafter, the apparatus for tagging a topic will be referred to as a topic tagging apparatus for simplicity.

According to an example embodiment, the topic tagging apparatus may tag a multifaceted topic to content by a unit of a scene by applying, in addition to the content, content-related unstructured data associated with the content, and a social network and viewing situation information of a viewer of the content. Here, the tagging may also be referred to as indexing, and the content may be broadcast content.

Referring to FIG. 1, a topic tagging apparatus 100 includes an unstructured data-based topic generator 110, a viewer group analyzer 120, a multifaceted topic generator 130, a content divider 140, and a tagger 150.

The topic tagging apparatus 100 may receive content from a content storage 180, and receive content-related unstructured data associated with the content from a content-related unstructured data storage 190. The unstructured data-based topic generator 110 may generate an unstructured data-based topic based on unstructured data. The unstructured data may include the content-related unstructured data, for example, subtitles and dialogue scripts, and external unstructured data to be posted on a website, for example, a blog post and news.

The topic tagging apparatus 100 may collect, from a social network and viewing situation storage 170, a social network and viewing situation information of a viewer of the content. The viewer group analyzer 120 may generate a viewer group based on the social network and the viewing situation information, and extract information from each generated viewer group. The information of each viewer group may include a characteristic of each viewer group.

The multifaceted topic generator 130 may generate a multifaceted topic for each viewer group based on the information of each viewer group and the unstructured data-based topic, and calculate a weight of the multifaceted topic. The content divider 140 may divide the input content into a plurality of scenes or other higher units. A unit by which the content is to be divided may be a scene or a set of the scenes. The tagger 150 may tag the multifaceted topic to a scene obtained through the division.

Figure 2:
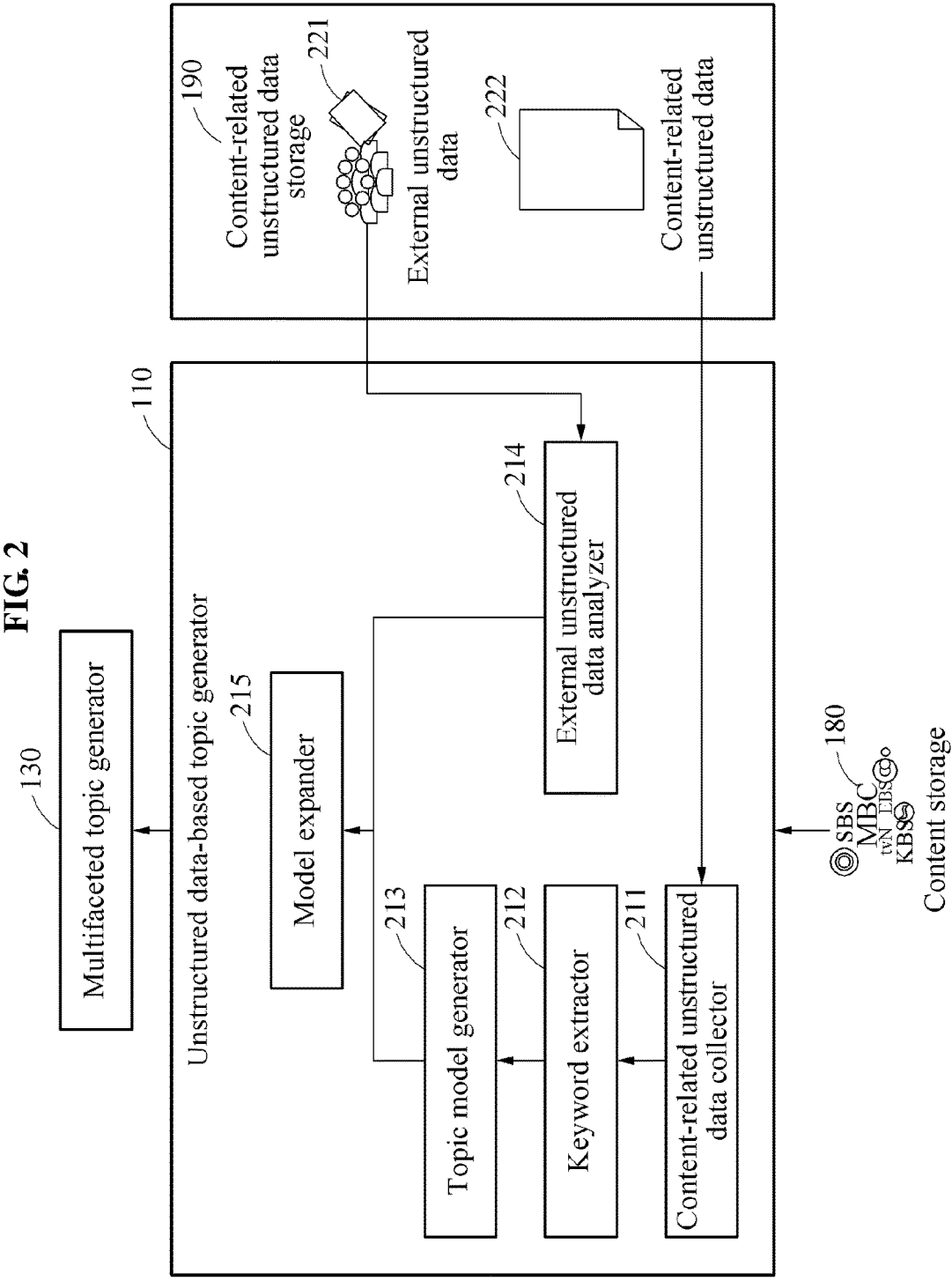
FIG. 2 is a diagram illustrating a configuration of an unstructured data-based topic generator according to an example embodiment.

FIG. 2 is a diagram illustrating a configuration of the unstructured data-based topic generator 110 of FIG. 1.

The multifaceted topic generator 130 may generate a multifaceted topic for each viewer group based on information of each viewer group and an unstructured data-based topic, and calculate a weight of the multifaceted topic. Referring to FIG. 2, the unstructured data-based topic generator 110 includes a content-related unstructured data collector 211, a keyword extractor 212, a topic model generator 213, an external unstructured data analyzer 214, and a model expander 215.

The unstructured data-based topic generator 110 may collect two types of unstructured data from the content-related unstructured data storage 190. The content-related unstructured data collector 211 may collect content-related unstructured data 222, and the external unstructured data analyzer 214 may collect external unstructured data 221.

The content-related unstructured data 222 may refer to data directly associated with content, for example, dialogue scripts and subtitles, excluding the content itself. The external unstructured data 221 may refer to data indirectly associated with the content, for example, blog posts and news to be posted on a website and the like.

The keyword extractor 212 may extract a first keyword based on a local characteristic from the collected data. The local characteristic may refer to a characteristic that is indicated in a certain time domain based on a time axis. For example, when a keyword A is shown, at a high frequency, in a dialogue script or subtitles in a certain time domain, A may be referred to as a local characteristic in the time domain. The keyword extractor 212 may extract a second keyword based on the first keyword. The second keyword may be determined among first keywords based on respective frequency numbers of the first keywords. To prevent a generation of an overlapping topic or a noise topic, the second keyword may be determined based on a local frequency number of the first keyword included in the dialogue script or subtitles. That is, a probability of the first keyword being determined to be the second keyword may increase when the first keyword is concentrated in a certain time domain, has a high frequency, and is semantically representative. The second keyword may also be referred to as a seed word.

The topic model generator 213 may generate an unstructured data-based topic of the content using the first keyword and the second keyword, and generate a topic model based on the generated unstructured data-based topic. The topic model may include the unstructured data-based topic. Here, a generation of a model may also be referred to as training the model.

The model expander 215 may expand a trained topic model based on the external unstructured data 221. The external unstructured data analyzer 214 may receive the external unstructured data 221 from the content-related unstructured data storage 190. The external unstructured data analyzer 214 may extract a third keyword from the external unstructured data 221.

The model expander 215 may expand the topic model based on the extracted third keyword. The model expander 215 may determine whether the third keyword extracted from the external unstructured data 221 is highly associated with a keyword of an existing topic, for example, the first keyword and the second keyword. When the third keyword is highly associated with the keyword, the model expander 215 may expand the keyword of the existing topic. Conversely, when the third keyword is less associated with the keyword, the model expander 215 may generate a new topic.

Figure 3:
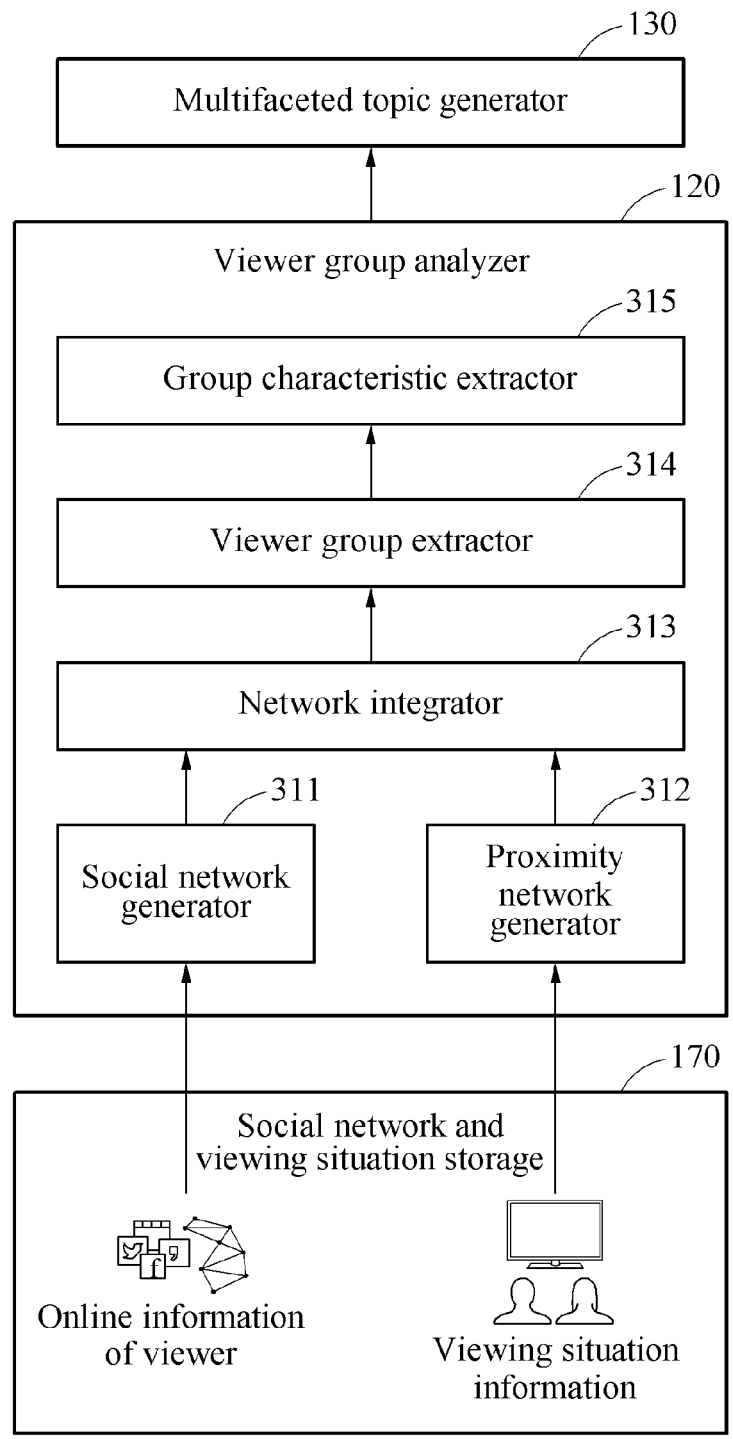
FIG. 3 is a diagram illustrating a configuration of a viewer group analyzer according to an example embodiment.

FIG. 3 is a diagram illustrating a configuration of the viewer group analyzer 120 of FIG. 1.

The viewer group analyzer 120 may generate a viewer group based on a social network and viewing situation information of a viewer of content, and extract information of each viewer group. Referring to FIG. 3, the viewer group analyzer 120 includes a social network generator 311, a proximity network generator 312, a network integrator 313, a viewer group extractor 314, and a group characteristic extractor 315.

The viewer group analyzer 120 may receive online information and viewing situation information of a viewer of content from the social network and viewing situation storage 170. The social network generator 311 may generate an online network of the viewer based on the online information of the viewer. The online network may also be referred to as a social network.

The proximity generator 312 may generate a proximity network from the viewing situation information. The proximity network may be generated based on a proximity calculated based on information on, for example, a location, an age, and a gender of the viewer, and a device through which the viewer views the content.

The network integrator 313 may integrate the social network and the proximity network into a single integrated network. In detail, some of a plurality of viewers may simultaneously belong to the two networks, and the network integrator 313 may integrate the two networks.

For example, a social network N may include {Vn, En}, wherein Vn denotes a node and En denotes an edge that indicates a relationship between nodes. A proximity network P may include {Vp, Ep }, wherein Vp denotes a node and Ep denotes an edge that indicates a relationship between nodes. Dissimilar to the social network N that extracts an explicit relationship, Ep may be generated based on a proximity function Dp( ) Here, |Vn ∩Vp|>0. The network integrator 313 may generate a combined social network by connecting neighboring viewers around a user belonging to both the social network N and the proximity network P. The combined social network may also be referred to as a combined network.

The viewer group extractor 314 may extract a viewer group from the integrated network. The viewer group may be extracted by dividing the combined social network to generate k subgraphs. The group characteristic extractor 315 may extract a common characteristic of the viewer group extracted from the integrated network, and a value of the characteristic. For example, the group characteristic extractor 315 may obtain an age as a characteristic shared by a plurality of viewer groups, and obtain 20s as a value of the age.

Figure 4:
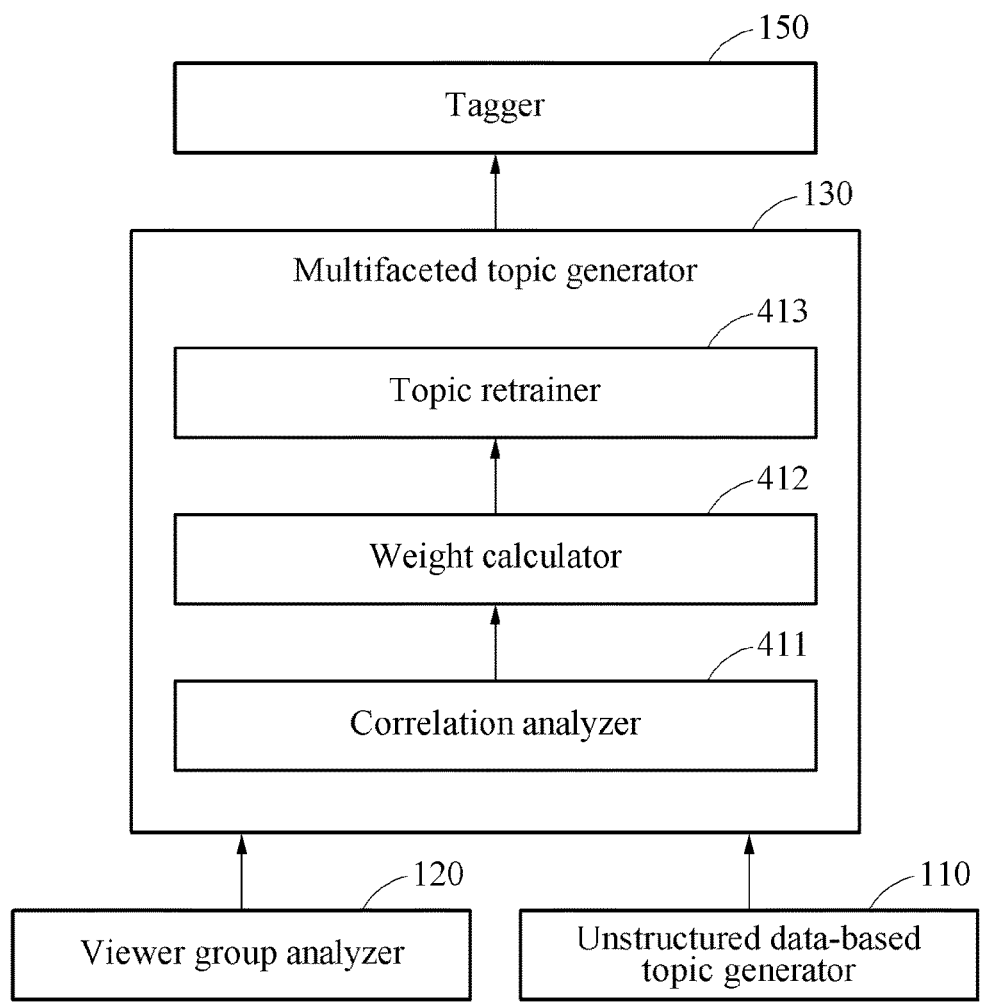
FIG. 4 is a diagram illustrating a configuration of a multifaceted topic generator according to an example embodiment.

FIG. 4 is a diagram illustrating a configuration of the multifaceted topic generator 130 of FIG. 1.

The multifaceted topic generator 130 may generate a multifaceted topic for each viewer group based on information of each viewer group and an unstructured data-based topic, and calculate a weight of the multifaceted topic. The multifaceted topic generator 130 may combine, with a topic model, a viewer group obtained from the viewer group analyzer 120 and information about a characteristic of the viewer group.

Referring to FIG. 4, the multifaceted topic generator 130 includes a correlation analyzer 411, a weight calculator 412, and a topic retrainer 413. Here, the term "multifaceted" may also be referred to as "multi-domain."

The correlation analyzer 411 may analyze a correlation between an unstructured data-based topic and a characteristic of a viewer group. The weight calculator 412 may calculate a weight for each viewer group corresponding to the unstructured data-based topic based on the correlation, and apply the calculated weight to a topic model. The weight calculator 412 may calculate a weight for each viewer group by a keyword unit, and calculate a topic weight by combining the calculated weights. The multifaceted topic generator 130 may generate a connection between a viewer group and a topic.

The topic retrainer 413 may eliminate a topic that is less associated with the viewer group, and allocate a keyword included in the topic to a previous topic or a new topic.

Figure 5:
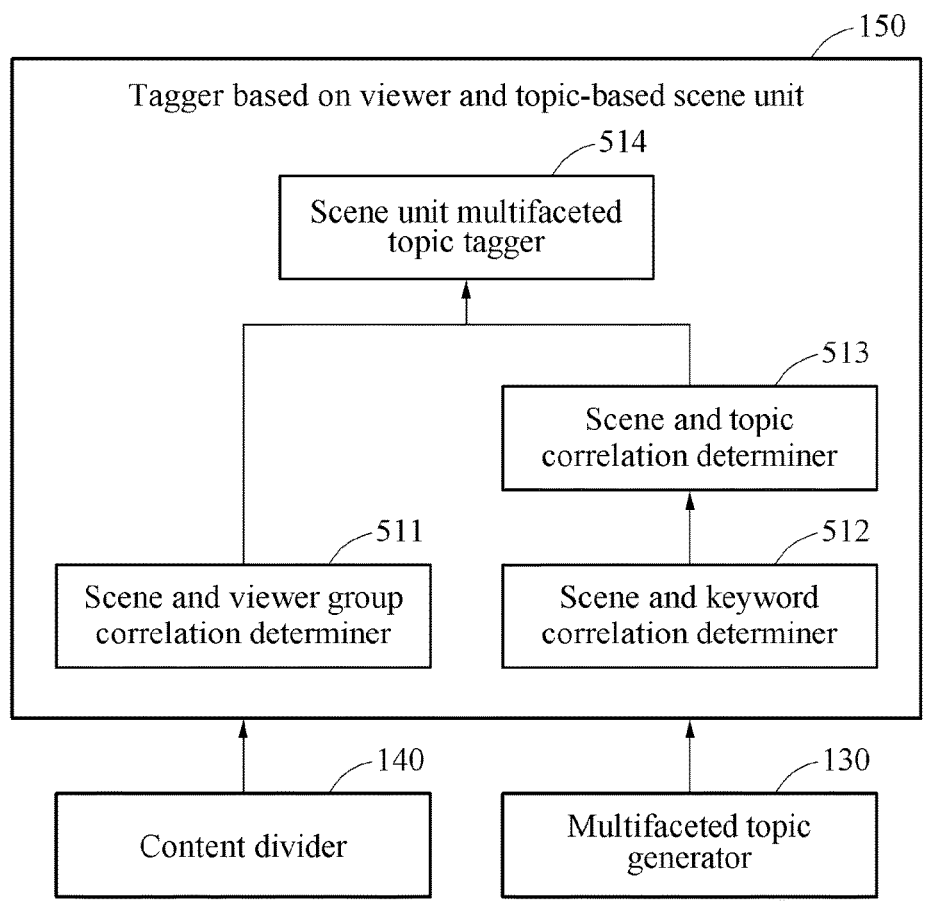
FIG. 5 is a diagram illustrating a configuration of a tagger based on a viewer and topic-based scene unit according to an example embodiment.

FIG. 5 is a diagram illustrating the tagger 150 of FIG. 1 based on a viewer and topic-based scene unit.

The tagger 150 may tag a multifaceted topic to a scene obtained by dividing content into a plurality of scenes. Here, the content divider 140 may divide a single content into a plurality of scenes. For example, a scene may include a start frame S and an end frame E. When the start frame S and the end frame E are given to a scene, the tagger 150 may determine whether a multifaceted topic obtained from the multifaceted topic generator 130 is to be tagged to a corresponding frame section.

A scene and viewer group correlation determiner 511 of the tagger 150 may determine a correlation between a scene and a viewer group. The tagger 150 may determine a correlation between a scene and a viewer group associated with the multifaceted topic. When a certain scene of broadcast content is given, the tagger 150 may determine the correlation between the scene and the viewer group based on a characteristic of the viewer group, for example, how much a viewer included in the viewer group views a corresponding frame section and information on an activity of the viewer in an online community.

A scene and keyword correlation determiner 512 of the tagger 150 may determine a correlation between a scene and a keyword. The tagger 150 may determine a correlation between a keyword included in a topic and a corresponding scene. The correlation may be determined based on a keyword associated with a timeline of the content, for example, time information indicated in, for example, a closed caption, and tag information including a time axis.

A scene and topic correlation determiner 513 of the tagger 150 may determine a correlation between a scene and a topic. The tagger 150 may determine a correlation between a scene and a topic by combining the correlation between the scene and the keyword.

A scene-unit multifaceted topic tagger 514 of the tagger 150 may tag the multifaceted topic to a scene based on a scene unit. The tagger 150 may tag the multifaceted topic by combining a correlation among the scene, a viewer, and a topic.

The tagger 150 may store, in a multifaceted topic-based scene-unit metadata storage 160 of FIG. 1, multifaceted topic tagging information of a scene based on a scene unit. Details to be stored may include, for example, a characteristic of a viewer, topic information, a topic weight based on a viewer, scene division information, and a topic weight for each viewer group based on a scene unit, and may be stored in a format, for example, a java script object notation (JSON) and an extensible markup language (XML) according to an embodiment.

Figure 6:
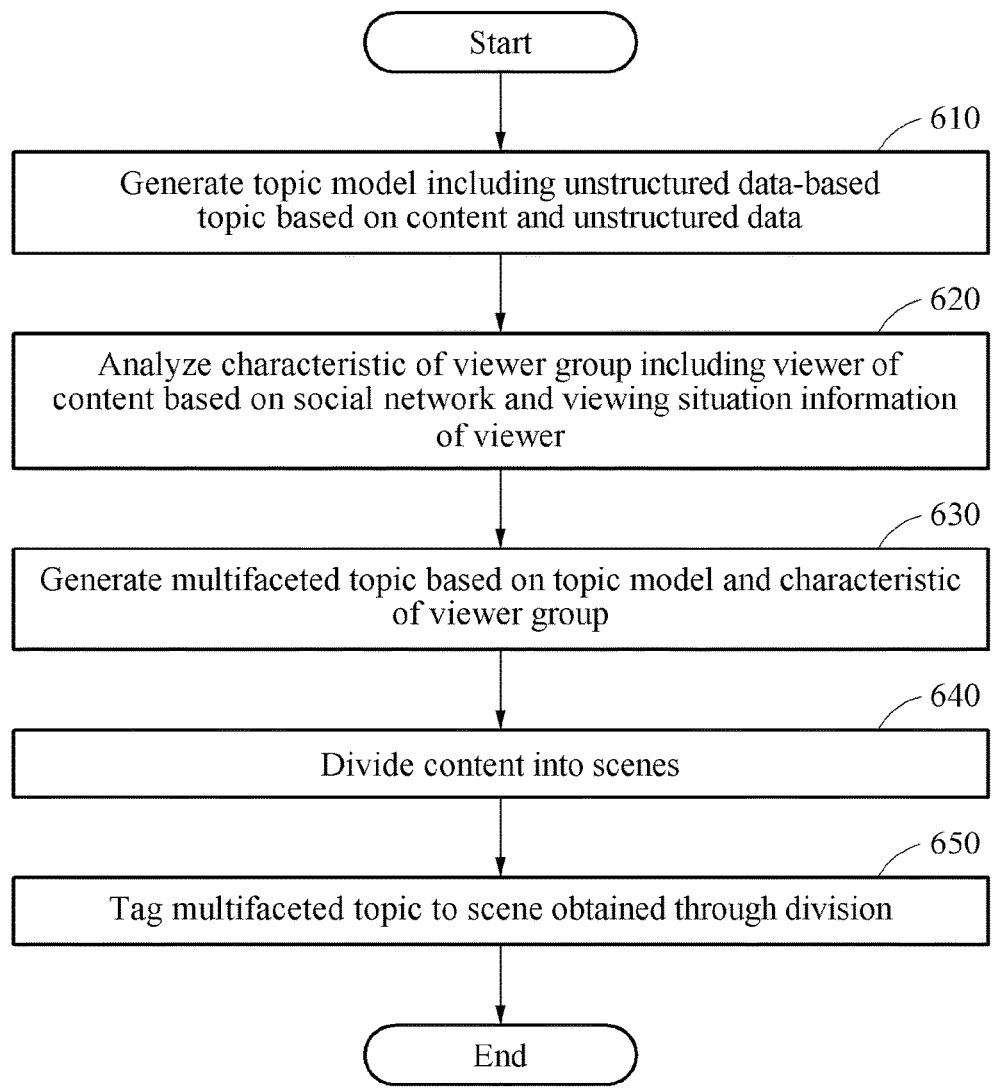
FIG. 6 is a flowchart illustrating a method of tagging a topic according to an example embodiment.

FIG. 6 is a flowchart illustrating a method of tagging a topic according to an example embodiment.

Referring to FIG. 6, in operation 610, the topic tagging apparatus 100 generates a topic model including an unstructured data-based topic based on content and unstructured data. In operation 620, the topic tagging apparatus 100 analyzes a characteristic of a viewer group including a viewer of the content based on a social network and viewing situation information of the viewer. In operation 630, the topic tagging apparatus 100 generates a multifaceted topic based on the topic model and the characteristic of the viewer group. In operation 640, the topic tagging apparatus 100 divides the content into a plurality of scenes. In operation 650, the topic tagging apparatus 100 tags the multifaceted topic to a scene obtained through the division.

According to example embodiments described herein, by tagging a multifaceted topic to content based on viewing situation information and unstructured data, various pieces of information associated with the content may be provided to a user.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An apparatus for tagging a topic to content based on a viewing situation, the apparatus comprising:
    an unstructured data-based topic generator configured to generate a topic model comprising an unstructured data-based topic based on the content and unstructured data, wherein the content includes at least one of content-related unstructured data and external unstructured data, the content-related unstructured data including subtitles and content dialogue, and the external unstructured data including a blog post and news;
    a viewer group analyzer configured to analyze a characteristic of a viewer group comprising a viewer of the content based on a social network of the viewer and viewing situation information of the viewer;
    a multifaceted topic generator configured to generate a multifaceted topic based on the topic model and the characteristic of the viewer group;
    a content divider configured to divide the content into a plurality of scenes; and
    a tagger configured to tag the multifaceted topic to a scene obtained through the division,
    wherein the unstructured data-based topic generator, the viewer group analyzer, the multifaceted topic generator, the topic divider, and the tagger each comprise a processing unit including a processor running software to cause the processing unit to perform the functions of the unstructured data-based topic generator, the viewer group analyzer, the multifaceted topic generator, the topic divider, and the tagger, respectively.

2. The apparatus of claim 1, wherein the unstructured data-based topic generator comprises:
    a content-related unstructured data collector configured to collect, from the content, content-related unstructured data associated with the content;
    a keyword extractor configured to extract a first keyword and a second keyword from the content-related unstructured data; and
    a topic model generator configured to generate the unstructured data-based topic on the content using the first keyword and the second keyword, and generate the topic model based on the unstructured data-based topic,
    wherein the second keyword is determined among first keywords based on respective frequency numbers of the first keywords.

3. The apparatus of claim 2, wherein the unstructured data-based topic generator comprises:
    an external unstructured data analyzer configured to extract a third keyword from external unstructured data; and
    a model expander configured to expand the topic model based on the third keyword.

4. The apparatus of claim 1, wherein the viewer group analyzer comprises:
    a social network generator configured to generate the social network based on online information of the viewer;
    a proximity network generator configured to generate a proximity network from the viewing situation information;
    a network integrator configured to integrate the social network and the proximity network; and
    a group characteristic extractor configured to extract a common characteristic of the viewer group based on an integrated network obtained through the integration.

5. The apparatus of claim 4, further comprising:
    a viewer group extractor configured to extract the viewer group from the integrated network.

6. The apparatus of claim 1, wherein the multifaceted topic generator comprises:
    a correlation analyzer configured to analyze a correlation between the unstructured data-based topic and the characteristic of the viewer group; and
    a weight calculator configured to calculate a weight for each viewer group corresponding to the unstructured data-based topic based on the correlation, and apply the calculated weight to the topic model.

7. The apparatus of claim 6, wherein the multifaceted topic generator further comprises:
    a topic model retrainer configured to change the topic model based on the correlation.

8. The apparatus of claim 1, wherein the tagger is configured to analyze a correlation between the viewer group and the scene and a correlation between the multifaceted topic and the scene, and
tag the multifaceted topic to the scene based on the correlation between the viewer group and the scene and the correlation between the multifaceted topic and the scene.

9. The apparatus of claim 8, wherein the correlation between the multifaceted topic and the scene is analyzed based on a correlation between a first keyword and the scene,
wherein the first keyword is extracted from content-related unstructured data associated with the content.

10. A method of tagging a topic, comprising:
generating, by a processor, a topic of broadcast content based on characteristics of the broadcast content;
extracting, by the processor, a characteristic of a viewer group based on viewing information of a viewer of the broadcast content;
generating, by the processor, a multifaceted topic based on the topic of the broadcast content and the characteristic of the viewer group;
dividing the broadcast content into units of one or more scenes; and
tagging the multifaceted topic to the divided broadcast content.

11. The method of claim 10, wherein the generating of the topic comprises:
collecting broadcast content-related unstructured data associated with the broadcast content;
extracting a first keyword based on the collected broadcast content-related unstructured data;
extracting a second keyword of the topic based on the extracted first keyword;
generating an unstructured data-based topic on the broadcast content using the first keyword and the second keyword, and generating a topic model based on the unstructured data-based topic; and
extracting a third keyword using the topic model and external unstructured data.

12. The method of claim 10, further comprising:
storing information associated with the tagged multifaceted topic as metadata.

13. A method of tagging a topic to content based on a viewing situation, the method comprising:
generating, by a processor, a topic model comprising an unstructured data-based topic based on the content and unstructured data, wherein the content includes at least one of content-related unstructured data including subtitles and content dialogue, and external unstructured data including a blog post and news;
analyzing a characteristic of a viewer group comprising a viewer of the content based on a social network of the viewer and viewing situation information of the viewer;
generating a multifaceted topic based on the topic model and the characteristic of the viewer group;
dividing the content into a plurality of scenes; and
tagging the multifaceted topic to a scene obtained through the division.

14. The method of claim 13, wherein the generating of the topic model comprises:
collecting content-related unstructured data associated with the content;
extracting a first keyword and a second keyword from the content-related unstructured data; and
generating the unstructured data-based topic on the content using the first keyword and the second keyword, and generating the topic model based on the unstructured data-based topic.

15. The method of claim 14, wherein the generating of the topic model comprises:
extracting a third keyword from external unstructured data; and
expanding the topic model based on the third keyword.

* * * * *